US008280882B2

US008280882B2

(12) United States Patent
Troy et al.

(10) Patent No.: US 8,280,882 B2
(45) Date of Patent: Oct. 2, 2012

(54) AUTOMATIC EXPERT IDENTIFICATION, RANKING AND LITERATURE SEARCH BASED ON AUTHORSHIP IN LARGE DOCUMENT COLLECTIONS

(75) Inventors: Adam D. Troy, Westlake, OH (US); Guo-Qiang Zhang, Orange, OH (US); Mehran Mehregany, Pepper Pike, OH (US)

(73) Assignee: Case Western Reserve University, Cleveland, OH (US)

( * ) Notice: Subject to any disclaimer, the term of this patent is extended or adjusted under 35 U.S.C. 154(b) by 291 days.

(21) Appl. No.: 11/379,470

(22) Filed: Apr. 20, 2006

(65) Prior Publication Data

US 2006/0248076 A1 Nov. 2, 2006

Related U.S. Application Data

(60) Provisional application No. 60/673,462, filed on Apr. 21, 2005.

(51) Int. Cl.
*G06F 17/30* (2006.01)
(52) U.S. Cl. ........ 707/735; 707/723; 707/737; 707/748; 707/758; 707/765
(58) Field of Classification Search ........................ None
See application file for complete search history.

(56) References Cited

U.S. PATENT DOCUMENTS

| | | | | |
|---|---|---|---|---|
| 3,612,744 A | * | 10/1971 | Thomas | 174/36 |
| 4,595,203 A | * | 6/1986 | DeLano et al. | 273/148 R |
| 5,255,184 A | * | 10/1993 | Hornick et al. | 705/6 |
| 5,276,741 A | * | 1/1994 | Aragon | 382/229 |
| 5,598,557 A | * | 1/1997 | Doner et al. | 1/1 |
| 5,987,457 A | * | 11/1999 | Ballard | 1/1 |
| 6,094,649 A | * | 7/2000 | Bowen et al. | 707/711 |
| 6,098,066 A | * | 8/2000 | Snow et al. | 1/1 |
| 6,287,765 B1 | * | 9/2001 | Cubicciotti | 435/6.11 |
| 6,292,830 B1 | * | 9/2001 | Taylor et al. | 709/224 |
| 6,505,166 B1 | | 1/2003 | Stephanou | |
| 6,601,075 B1 | * | 7/2003 | Huang et al. | 707/104.1 |
| 6,678,679 B1 | * | 1/2004 | Bradford | 1/1 |
| 6,901,394 B2 | * | 5/2005 | Chauhan et al. | 706/60 |
| 6,901,399 B1 | * | 5/2005 | Corston et al. | 1/1 |
| 6,954,750 B2 | * | 10/2005 | Bradford | 1/1 |
| 7,096,223 B2 | * | 8/2006 | Cope | 707/661 |

(Continued)

OTHER PUBLICATIONS

Campbell, C., et al.; Expertise Identification using Email Communications; Nov. 2003; 4 pages.

(Continued)

*Primary Examiner* — Farhan Syed
(74) *Attorney, Agent, or Firm* — Tarolli, Sundheim, Covell & Tummino LLP

(57) ABSTRACT

Disclosed is an author-centric search that facilitates identifying a source commonly associated with a topic by, for example, providing a ranked listing of experts in a field of knowledge related to a search phrase. The search phrase can be captured and parsed into the individual words (e.g., substrings) of the search phrase. Based on occurrences of the words in one or more documented communications, statistics can be generated to determine the relevancy of each documented communication in relation to the search phrase. Further, additional statistics can be generated describing the occurrence of multiple words in a documented communication and/or a distance of words between the search phrase words in a documented communication. The statistics can be utilized to generate expert scores. The expert scores can be sorted for and/or displayed to the user.

15 Claims, 10 Drawing Sheets

U.S. PATENT DOCUMENTS

| | | | |
|---|---|---|---|
| 7,124,353 B2* | 10/2006 | Goodwin et al. | 715/234 |
| 7,124,362 B2* | 10/2006 | Tischer | 715/255 |
| 7,178,100 B2* | 2/2007 | Call | 715/210 |
| 7,437,382 B2* | 10/2008 | Zhang et al. | 1/1 |
| 7,590,603 B2* | 9/2009 | Zhang et al. | 706/12 |
| 7,600,017 B2* | 10/2009 | Holtzman et al. | 709/224 |
| 7,634,475 B1* | 12/2009 | Hernek | 1/1 |
| 7,783,668 B2* | 8/2010 | Vogel et al. | 707/791 |
| 7,802,183 B1* | 9/2010 | Essin | 715/255 |
| 7,809,709 B1* | 10/2010 | Harrison, Jr. | 707/707 |
| 7,840,569 B2* | 11/2010 | Meyerzon et al. | 707/748 |
| 7,849,077 B2* | 12/2010 | Liao et al. | 707/718 |
| 7,890,514 B1* | 2/2011 | Mohan et al. | 707/748 |
| 8,005,858 B1* | 8/2011 | Lynch et al. | 707/771 |
| 8,126,882 B2* | 2/2012 | Lawyer | 707/723 |
| 8,155,579 B2* | 4/2012 | Weaver et al. | 434/362 |
| 8,195,522 B1* | 6/2012 | Sonne et al. | 705/26.2 |
| 2002/0073079 A1* | 6/2002 | Terheggen | 707/3 |
| 2003/0014311 A1* | 1/2003 | Chua | 705/14 |
| 2003/0074302 A1* | 4/2003 | Cope | 705/37 |
| 2003/0121008 A1* | 6/2003 | Tischer | 715/530 |
| 2003/0135818 A1* | 7/2003 | Goodwin et al. | 715/500 |
| 2003/0140037 A1* | 7/2003 | Deh-Lee | 707/3 |
| 2003/0167275 A1* | 9/2003 | Rjaibi | 707/101 |
| 2003/0217052 A1* | 11/2003 | Rubenczyk et al. | 707/3 |
| 2004/0083211 A1* | 4/2004 | Bradford | 707/3 |
| 2004/0139107 A1* | 7/2004 | Bachman et al. | 707/104.1 |
| 2005/0203924 A1* | 9/2005 | Rosenberg | 707/100 |
| 2006/0112036 A1* | 5/2006 | Zhang et al. | 706/20 |
| 2006/0112392 A1* | 5/2006 | Zhang et al. | 718/102 |
| 2006/0242554 A1* | 10/2006 | Gerace et al. | 715/501.1 |
| 2006/0248076 A1* | 11/2006 | Troy et al. | 707/5 |
| 2006/0282328 A1* | 12/2006 | Gerace et al. | 705/14 |
| 2007/0078814 A1* | 4/2007 | Flowers et al. | 707/2 |
| 2007/0118802 A1* | 5/2007 | Gerace et al. | 715/738 |
| 2007/0124432 A1* | 5/2007 | Holtzman et al. | 709/219 |
| 2007/0185859 A1* | 8/2007 | Flowers et al. | 707/5 |
| 2007/0192309 A1* | 8/2007 | Fischer et al. | 707/5 |
| 2007/0198506 A1* | 8/2007 | Attaran Rezaei et al. | 707/5 |
| 2007/0208732 A1* | 9/2007 | Flowers et al. | 707/5 |
| 2007/0214048 A1* | 9/2007 | Chan et al. | 705/14 |
| 2007/0217693 A1* | 9/2007 | Kretzschmar, Jr. | 382/229 |
| 2007/0245035 A1* | 10/2007 | Attaran Rezaei et al. | 709/238 |
| 2008/0010268 A1* | 1/2008 | Liao et al. | 707/5 |
| 2008/0189273 A1* | 8/2008 | Kraftsow et al. | 707/5 |
| 2009/0094117 A1* | 4/2009 | Zaccagnino | 705/14 |
| 2009/0094212 A1* | 4/2009 | Zaccagnino | 707/3 |
| 2009/0106223 A1* | 4/2009 | Meyerzon et al. | 707/5 |
| 2009/0112652 A1* | 4/2009 | Kelsey et al. | 705/7 |
| 2009/0150497 A1* | 6/2009 | McAfee et al. | 709/206 |
| 2009/0157491 A1* | 6/2009 | Brougher et al. | 705/11 |
| 2010/0162093 A1* | 6/2010 | Cierniak | 715/205 |
| 2010/0198802 A1* | 8/2010 | Kraftsow et al. | 707/706 |
| 2011/0040787 A1* | 2/2011 | Cierniak et al. | 707/770 |
| 2011/0041075 A1* | 2/2011 | Cierniak et al. | 715/745 |
| 2011/0264653 A1* | 10/2011 | Cierniak et al. | 707/723 |
| 2012/0058459 A1* | 3/2012 | Obeid | 434/362 |
| 2012/0084149 A1* | 4/2012 | Gaudiano et al. | 705/14.54 |

OTHER PUBLICATIONS

McDonald, D., et al.; Expertise Recommender: A Flexible Recommendation System and Architecture; Dec. 2000; 10 pages.

Mattox, D., et al; Enterprise Expert and Knowledge Discovery; 11 pages.

Liu, P.; An Empirical Investigation of Expertise Matching within Academia; Sep. 2003; 214 pages.

Sihn, W., et al; Xpertfinder—Expert Finding Within Specified Subject Areas Through Analysis of Email Communication; 2001; 5 pages.

* cited by examiner

AUTOMATIC EXPERT IDENTIFICATION, RANKING AND LITERATURE SEARCH BASED ON AUTHORSHIP IN LARGE DOCUMENT COLLECTIONS

CROSS-REFERENCE TO RELATED APPLICATIONS

This application claims the benefit of U.S. Provisional Application Ser. No. 60/673,462, filed Apr. 21, 2005, entitled "AUTOMATIC EXPERT IDENTIFICATION, RANKING AND LITERATURE SEARCH BASED ON AUTHORSHIP IN LARGE DOCUMENT COLLECTIONS," the entirety of which is incorporated herein by reference.

TECHNICAL FIELD

The following description relates generally to data searches and, more particularly, to an author-centric search engine.

BACKGROUND

Computer networks were developed to allow multiple computers to communicate with each other. In general, a network can include a combination of hardware and software that cooperate to facilitate the desired communications. One example of a computer network is the Internet, a sophisticated worldwide network of computer system resources.

The growing size of networks, particularly the Internet, makes it difficult to locate relevant information in an expedient fashion. As a result, search tools were developed to locate information on the network based on a query input by a user. Two common search methods include the use of search engines and directories, both having capability to search contents from the Internet. One difference between search engines and directories is in the manner in which each tool compiles the content. Search engines comprise a search tool referred to as a spider, a crawler, or a robot, which builds indexes of the contents contained in the traversed addresses according to well-known protocols and algorithms. The results are then collected for the user to query and explore.

A user-input query in the form of search words, phrases, keywords, network addresses, etc., prompts the search engine to sift through the plurality of collected contents (typically on the order of millions) in the index to find matches to the user query. Conventional search tools reside on a server accessible to multiple users. Search queries are sent from the users to the search tools through a network connection. The search tools respond to the user query and execute a search algorithm to identify any network addresses containing information matching the query. In theory, spiders are capable of traversing the entire Internet to locate matching URLs (Uniform Resource Locator). In practice, however, only a small fraction of the Internet is traversed when building a collection/repository. Directories are similarly limited because the indexes are selectively compiled by human operators.

One problem with conventional search tools is a lack of contextual search results. Current tools do not provide a user with some forms of information related to the search query. For example, a user may want to identify a person and/or source that is commonly associated with a particular topic. Since conventional search tools only return results based on word matches, the user must seek out individuals with a high level of domain knowledge to find an expert for a given topic. This presents more problems as the opinions and suggestions of various individuals can vary, thereby making the user's contextual search subjective even when it is feasible. Another problem with conventional search tools is the use of extensive computational power spent by indexing. Such conventional search tools typically do not dynamically respond to user input and pre-compute a search function by considering all conceivable user queries.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

In accordance with some embodiments, contextual search results are provided that facilitate identifying a source commonly associated with a topic. A search system can perform identification and ranking of experts based on a search of a plurality of information sources. A user can input a search phrase that can be captured and parsed into individual words (e.g., substrings) of the search phrase. In order to provide a robust search, synonym substrings can be generated that are related to the search phrase. Based on occurrences of the words and the synonym substrings in one or more information sources, statistics can be generated in order to determine a relevancy score for each information source processed in the search.

To determine the relevancy score, the system can initialize a count array for each information source. Each count array has $(n*(n+1))/2$ array cells wherein n is the total number of words and synonym substrings from the search phrase. The system counts the number of times each word and each synonym substring occurs in each information source. Counts for each word and each synonym substring in the source are individually entered into the cells of the count array initialized for the associated information source. Further, the remaining empty count array cells can be filled with additional statistics that describe the occurrence of multiple words and/or synonym substrings in the information source.

A dot product calculation of both arrays can be employed to utilize the occurrence and distance statistic values and the weights to arrive at a relevancy score for each information source. One or more relevancy scores can be utilized to generate a score for each author associated with the information sources. The score for an author can be a weighted aggregate of the relevancy scores of all information sources of which the author is indicated as a contributor. Further, the expert scores of one or more authors can be sorted and/or displayed.

In another embodiment, a method is provided for an author-centric search. The method initializes two data structures for each documented communication processed by the search method. A user is prompted to enter a search string, and the search string can be parsed into the individual words that make up the search string. The method further fills the memory of the first data structure associated with each documented communication with data. The data is based on the occurrence of one or more of the words of the search string in an associated documented communication. Additionally, the memory of the first data structure can be filled with combination data that is based in part on a minimum count of information between the search string words for each possible combination of the words. Further, the method fills the memory of the second data structure with weighted values.

The weighted values indicate varying statistical preferences for the data in the corresponding cells of the first data structure. The method can execute a mathematical function that utilizes the data and the weighted values in the memory of the two data structures to compute a relevancy score for each documented communication.

The relevancy scores for each documented communication are used by the method to calculate a score for each author associated with the search. The method can calculate an aggregate of the relevancy scores for each documented communication associated with each author. Weights can also be established to signify a statistical preference for one or more aspects of the plurality of the documented communications.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
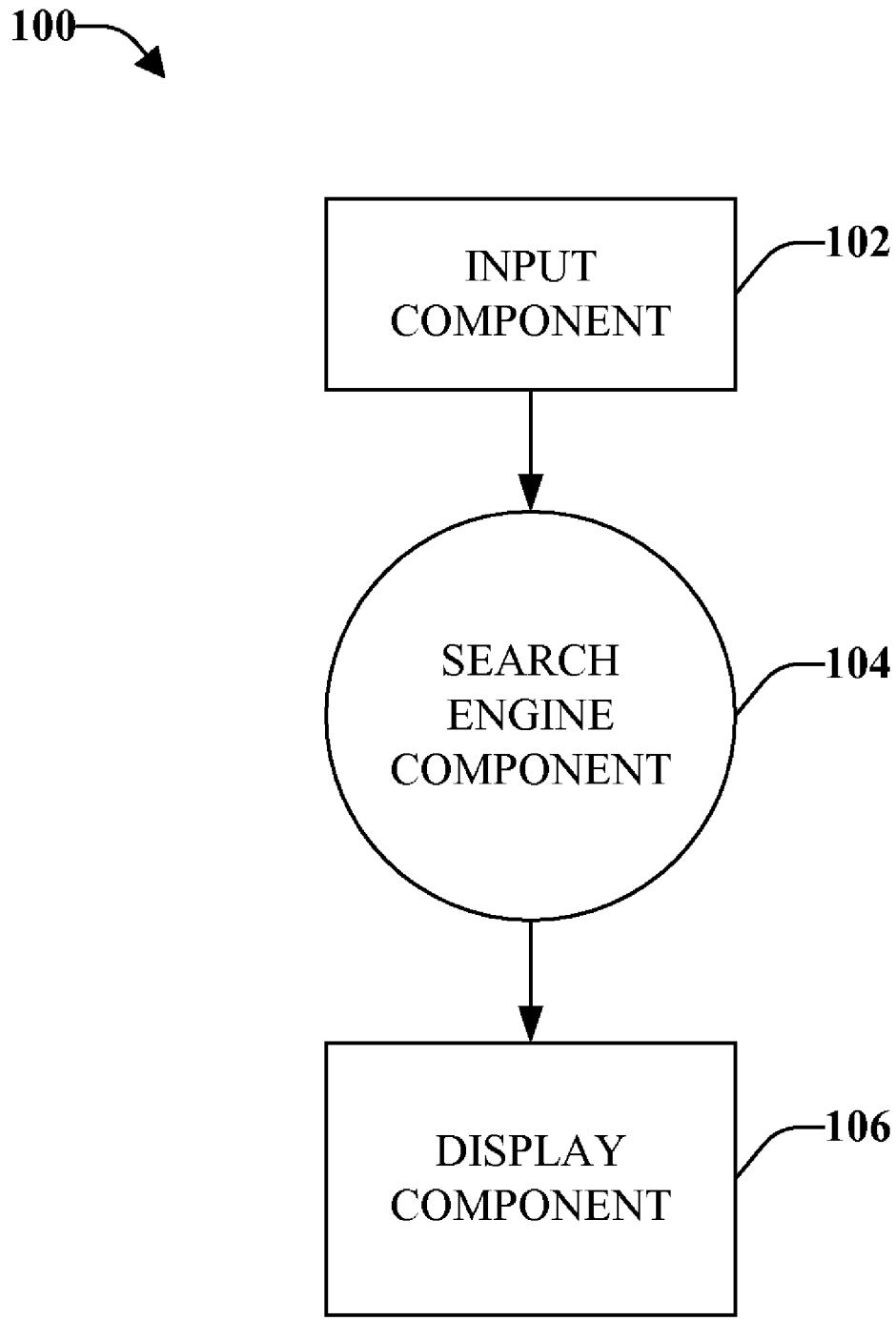
FIG. 1 illustrates a high-level block diagram of a search system in accordance with the disclosed embodiments.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments. Additionally, although specific examples set forth may use terminology that is consistent with client/server architectures or may even be examples of client/server implementations, skilled artisans will appreciate that the roles of client and server may be reversed, that the disclosed embodiments are not limited to client/server architectures and may be readily adapted for use in other architectures, specifically including peer-to-peer (P2P) architectures, without departing from the spirit or scope of the detailed description.

As used in this application, the terms "component," "array", "data structure," array cell," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. In addition, the word "exemplary" is used herein to mean serving as an example, instance, or illustration. Any aspect or design described herein as "exemplary" is not necessarily to be construed as preferred or advantageous over other aspects or designs.

It should also be appreciated that although specific examples presented may describe and/or depict systems or methods that are based upon searches of web pages, communications, documents, journals, reports, and/or published papers on the Internet, the disclosed embodiments are not limited to that domain. For example, the various embodiments may also be employed on an intranet or on the private network of a corporation and/or a university. Additionally or alternatively, the one or more embodiments can be used entirely on a single machine (e.g., computer, Personal Digital Assistant), as part of a desktop search system, and/or as part of a search system within a particular institutions and/or groups of institutions. Those of ordinary skill in the art will readily recognize that the subject embodiments can be used to search for authors of other types of information such as computer code, numerical data, studies, essays, photograph information, audio and/or video information, among others. Further, the various embodiments can interact with and enhance existing search and/or document database technologies.

Furthermore, it is to be appreciated that various embodiments can provide for reasoning about or infer states of the system, environment, and/or user from a set of observations as captured by events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed embodiments.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other supervised and unsupervised model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that can be utilized to develop models in accordance with the various embodiments. Thus, it will be readily apparent from the herein disclosure that a variety of functionalities described herein can take advantage of intelligent classification schemes in connection with searching, scoring and ranking in connection with the disclosed embodiments.

Various embodiments will be presented in terms of systems that may include a number of components, modules, and the like. It is to be understood and appreciated that the various systems may include additional components, modules, etc. and/or may not include all of the components, module etc. discussed in connection with the figures. A combination of these approaches may also be used.

The disclosed embodiments can be utilized as an extension to search techniques utilized in current document collections. Most document collections are searched using only keywords to find relevant documents. Often, though, the user is not seeking the most relevant document, but would prefer to find an author with the greatest expertise. The disclosed embodiments allow users of both public and private document collections to locate documents by author and/or author expertise. For example, may professional societies maintain large databases of scientific papers but do not provide any means of identifying leading researchers within the database. Corporations can utilize the disclosed embodiments to identify expertise within their own organizations, such as by utilizing proprietary document collections. Further, the disclosed embodiments can be utilized to provide an independent service ranking of individuals within various fields of expertise. Both commercial and non-commercial institutions (e.g., university libraries) can provide more relevant search results for those desiring information on a particular topic.

FIG. 1 illustrates a high-level block diagram of a search system 100 in accordance with the disclosed embodiments. System 100 includes an input component 102, a search engine component 104, and a display component 106. The input component 102 can be configured to accept an input from a user and/or entity (e.g., the Internet, another system, a computer, . . . ), hereinafter referred to as "user", or to allow the user to input one or more search phrases. Search engine component 104 can be configured to capture the search phrase and parse it into individual words (e.g., substrings) of the search phrase. The individual words can be processed by the search engine component 104 that can be configured to identify experts related to search phrase. Based on the occurrences of the words in one or more documented communications considered by the search engine component 104, an author-centric search algorithm can generate statistics in order to determine the relevancy of each documented communication. It should be understood that various algorithms, methods and/or techniques can be employed to identify experts related to a search phrase. Documented communications include published papers, presentations, patents, reports, and other documents. Search engine component 104 can be configured to utilize the statistics and generate scores for each author of each processed documented communication. The score for each unique author can be a weighted aggregate of the relevancy determinations for all documented communications of which each unique author is a contributor.

System 100 can further be configured to provide an ordered display (e.g., by display component 106) of the scores of the one or more authors. The ordered display can be a display of experts that can be configurable to meet predetermined user specifications regarding result display, sorting, content, and format. Alternatively or in addition, the display of experts can be selectively tailored to meet a specific user requirement(s). For example, the user can choose between an expert-based display and a document-based display. The expert-based display can provided a score ordered list of the top scoring authors and/or institutions, according to the choice of the user. The user can view the documents used in determining the score for an author. The document-based display can be chosen by the user for a standard document search that displays a ranked listing of the documents with the highest relevancy determinations.

It is noted that the system 100 can provide for a dynamic search that responds to the user input. Thus, the system 100 can save computational power by not indexing the one or more documented communications prior to the user entering one or more search phrases.

Figure 2:
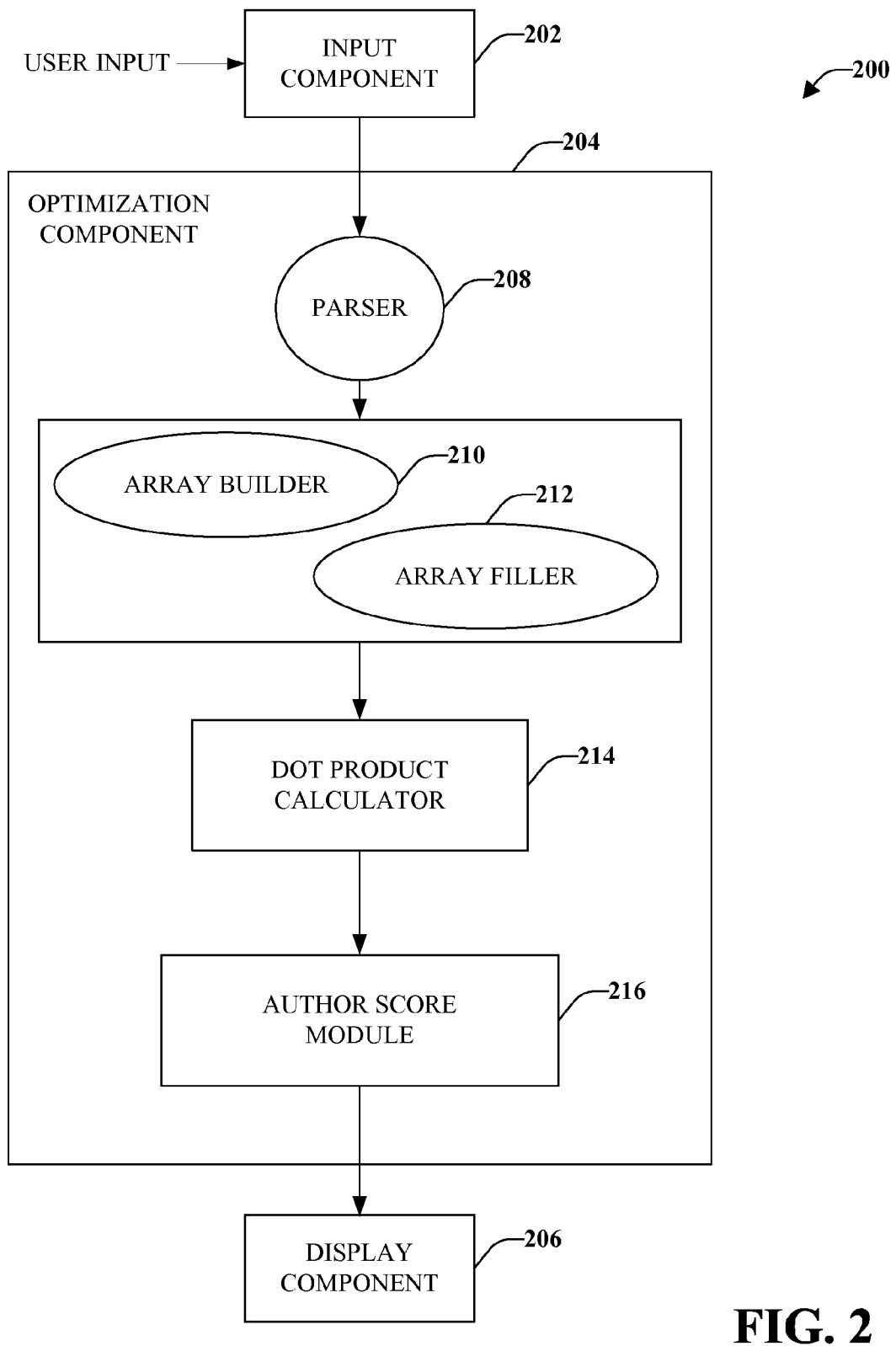
FIG. 2 illustrates a low-level block diagram of a search system in accordance with one or more embodiment.

FIG. 2 illustrates a low-level block diagram of an exemplary system 200 in accordance with one or more embodiment. The system 200 can include an input component 202 that receives a user input. System 200 also includes an optimization component 204 that can be configured to process the user input and can be similar to search engine 104 of FIG. 1. Optimization component 204 can include a parse component 208, an array builder component 210, an array filler component 212, a dot product calculator 214, and an author score module 216. System 200 also includes a display component 206 that presents the results to the user. Display component 206 can further format and displays the search results based in part on one or more author scores. Display component 206 can utilize various means to present the results. Such presentation can include vertical and/or horizontal scroll bars for navigation and toolbar buttons to determine whether a region will be viewable as well as other techniques.

Input component 202 can provide various types of user interfaces including, for example, a graphical user interface (GUI), a command line interface, and the like. For example, a GUI can be rendered that provides a user with a region or means to load, import, read, etc. a search term and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes.

The user can interact with the regions to select and provide information through various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the disclosed embodiments are not so limited. For example, merely highlighting a check box can initiate information conveyance. In another example, a command line interface can be employed. For example, the command line interface can prompt (e.g., by a text message on a display and an audio tone) the user for information by providing a text message. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Optimization component 204 can be configured to identify experts in a field of knowledge by determining relevance of one or more information source considered in a search, wherein such information source is associated with an author. An author can be an individual, a group of individuals, an institution (e.g., university), a publisher, a venue, a journal, a conference, a group, an entity, or a combination thereof. The information source can include a document, a web page, a documented communication, a record, a publication, an article, an essay, a patent, a compilation, a thesis, and the like. Optimization component 204 can employ a parse component 208 that can be configured to parse the user input (received at input component 202) into the individual words of the user input and synonyms for the words can be identified. The array builder component 210 can be configured to initialize two arrays for each information source. Such arrays can include a term statistic array or value array and a term weight array.

The array filler component 212 can be configured to fill the cells of each first array with statistics (e.g., occurrence count) related to the associated information source. A cell can be filled with the count of word occurrences of the information. The remaining cells of the first array can be filled with the inverse of the minimum word occurrence distance between the words for each combination of words and synonyms of the user input. The second array corresponds with the first array and is filled with weights by the array filler component 212.

Array filler component 212 can be implemented such that the weights of occurrences in a first portion can be more highly weighted than those in the second portion, for example. An occurrence of multiple words can be weighted more highly than an occurrence of fewer words and words that occur less often across all information sources can be weighted more highly than those that occur more often. The dot product calculator 214 can be configured to employ the statistics of both arrays for each information source to compute a dot product and arrive at a relevance score for each information source. For example, such additional statistics can describe a minimum distance of information between the words and/or synonym substrings of any possible combination of words and/or synonym substrings in the information source being processed. Furthermore, the occurrence and distance statistic values can be given weights. Such weights can be entered into a weight array and can create a statistical preference by placing the weights in weight array cells that correspond to the occurrence and distance statistic values in the cells of the count array.

After the information sources are scored for relevance, the authors associated with each information source processed during the search can be ranked. However, it should be understood that ranking by author can occur before the information sources are scored for relevance. In accordance with some embodiments, the information sources are not scored for relevance and only the author ranking is performed. The score for each author can calculated or generated by the author score module 216 and can be a weighted sum of all the relevancy scores for information sources related to each author. The author score can, in addition or alternatively, be based on an expert weight that can be a predefined value utilized to create a statistical preference for at least one characteristic of all the information sources. As an example, the weight can be a function of the publication date of the information source, the venue, the type of publication, and/or the number of authors for the information source. For example, the aspects of the documented communications that can be weighted are the date of publication, the venue, the type of documentation, the number of authors associated with the documented communication, and/or other pertinent forms or types of information. A mathematical function can be executed that utilizes the relevancy score aggregate for each author and the weights to arrive at a score for each author.

It is appreciated that the synonyms identified by system 200 can also include, in part, words (e.g. strings) that are closely and/or semantically related to the user input. Thus, such words are not exact synonyms of one or more words of the user input, but can be closely related in the meaning and/or usage of the user input.

System 200 can execute various means for ranking including, but not limited to, latent semantic indexing (LSI). In addition to the optimization component 204 recording which keywords occur in one or more documents, LSI can enable the optimization component 204 to examine an information source collection as a whole in order to see which other information sources contain some of those same words. Thus, LSI can allow the optimization component 204 to consider documents that have many words in common to be semantically close, and ones with few words in common to be semantically distant. The optimization component 204 can look at similarity values it has calculated for every content word, and can return one or more documents that best relate to the user input. Because a plurality of documents may be semantically very close, even if they do not share a particular keyword, an LSI algorithm does not necessarily need an exact match to return useful results. Accordingly, an LSI algorithm can enable the optimization component 204 to return and/or process one or more relevant information sources that do not contain the user input.

Figure 3:
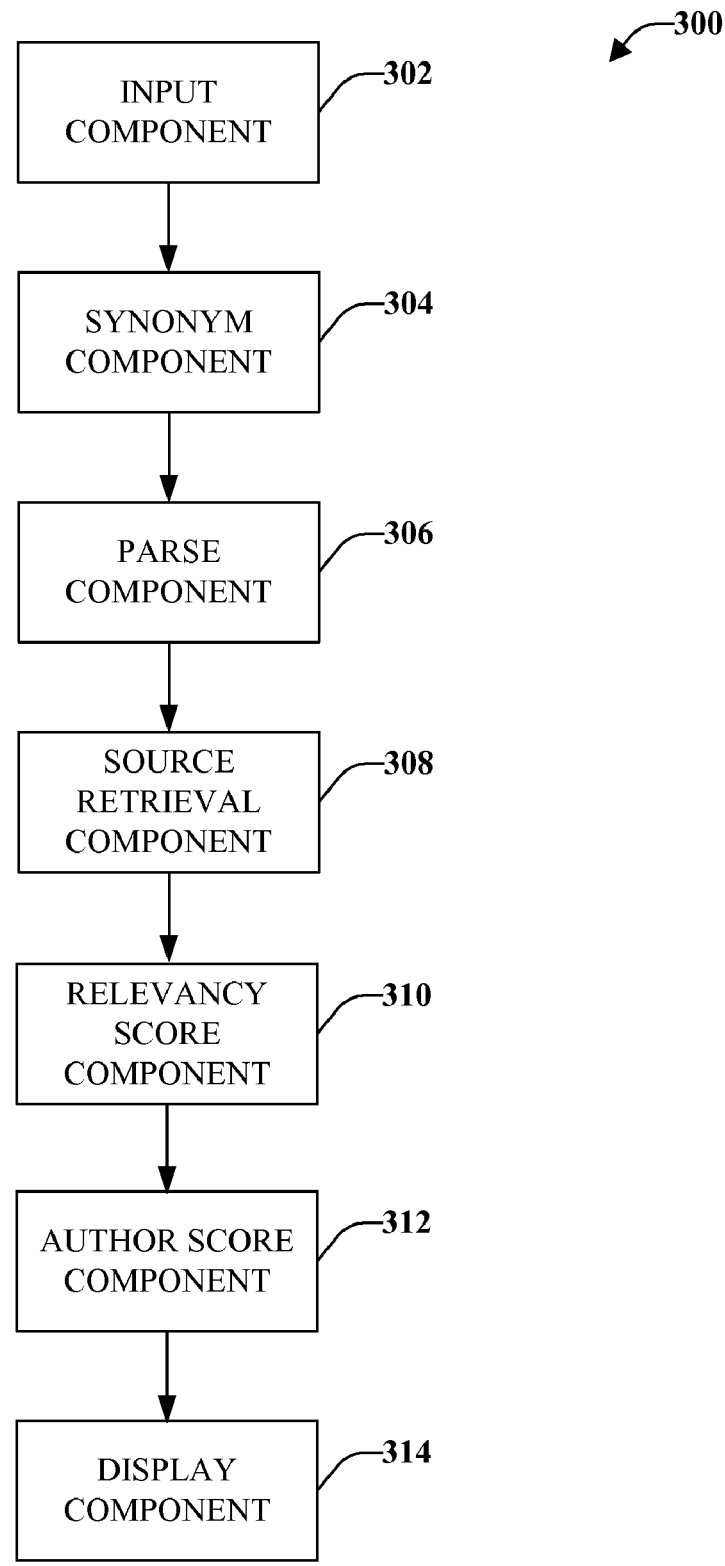
FIG. 3 illustrates another system 300 for an author-centric search.

FIG. 3 illustrates another system 300 for an author-centric search. System 300 includes an input component 302 that can be configured to receive an input from a user that include a search phrase (e.g., word, terms, string of terms or words, . . . ). Based on the user input, a synonym component 304 can be configured to create one or more synonym substrings related to the input search phrase. Such synonym substring(s) can include terms that are related to the input search phrase. The synonym substring(s) are utilized by a parse component 306 that can be configured to parse the input search phrase into one or more substrings and to create a substring set. The substring set can include the synonym substring(s) and the substring(s) generated by the parse component 306.

Based in part on the substring set(s), an information source retrieval component 308 can be configured to retrieve one or more information source related to the input search phrase. Such information sources can include web page(s), document(s), record(s), article(s), patent(s), and the like. At a similar time as the information sources are retrieved, a relevancy score component 310 can determine or calculate a relevancy score for the retrieved information sources associated with an author. The relevancy score can be utilized in conjunction with an expert weight score by an author score component 312 to determine or generate an author score. The expert weight can be a predefined value utilized to create a statistical preference for at least one characteristic of the retrieved information sources. The search results can be formatted and displayed by a display component 314 based on an author score or other ranking criteria.

In accordance with some embodiments, a predefined weight can be inputted into each of the array cells of the weight array. The predefined weight can relate to a level of significance assigned to an occurrence count and a distance count. This information can be input into a corresponding array cell of each count array associated with each information source.

Citation statistics can be utilized to identify important publications (e.g., documented communications and the like) in accordance with some embodiments. For example, two publications might contain all keywords or search terms. However, one publication might be more influential in the related field than the other publication. The important publication can receive a higher score though utilization of the citation statistic.

Figure 4:
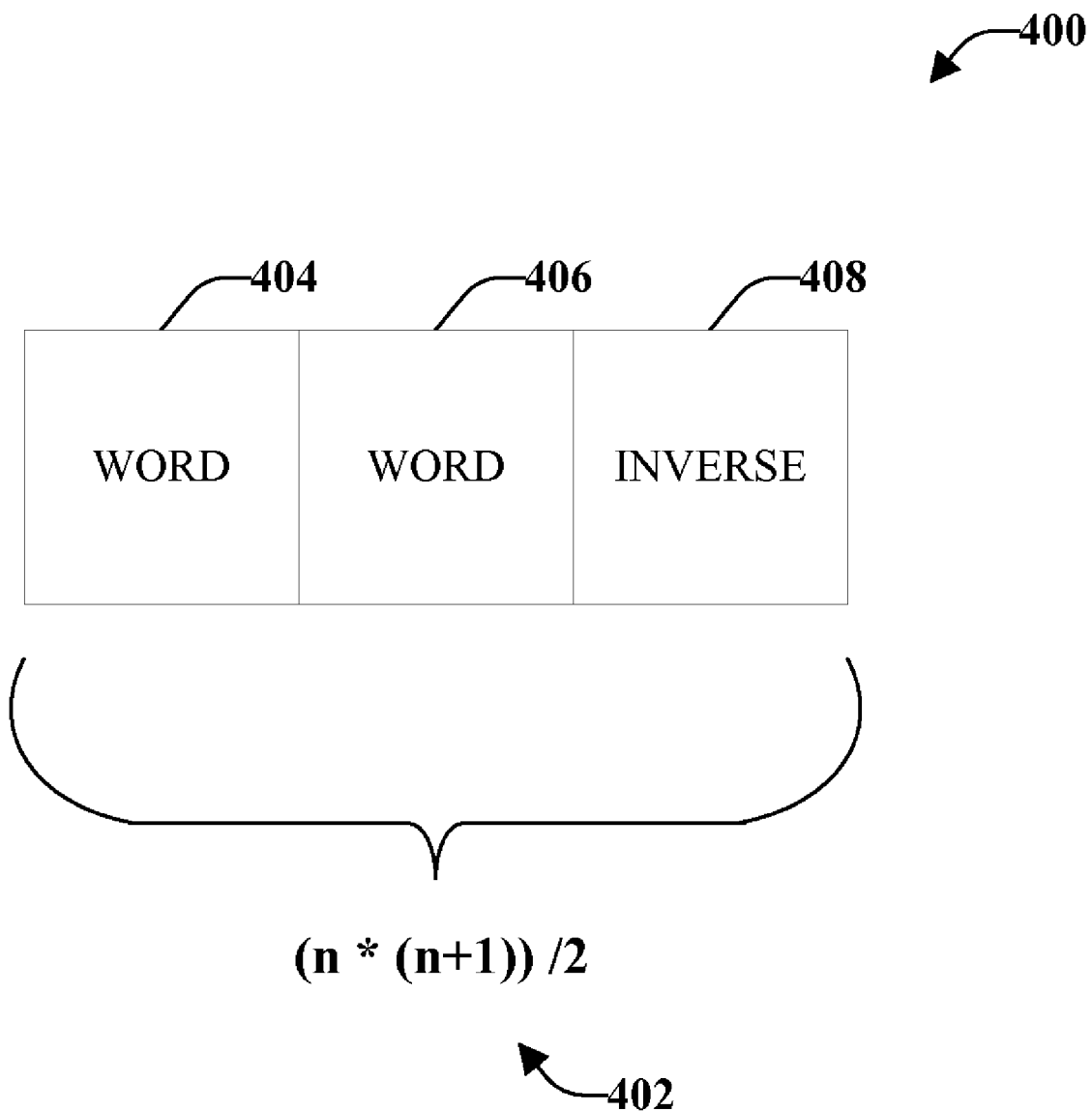
FIG. 4 illustrates a block diagram of a word occurrence statistic array in accordance with various embodiments.

FIG. 4 illustrates a block diagram of a word occurrence statistic array 400 in accordance with the various embodiments. For purposes of FIG. 4, the user search phrase associated with the block diagram is "silicon carbide." However, it should be understood that various words, phrases, strings, and the like can be input by a user and "silicon carbide" is utilized here for example purposes and not limitation. The length 402 of the array 400 can be determined by the equation $(n*(n+1))/2$, where n is the number of words in the search phrase. Hence, the array 400 provides for three array cells 404, 406, and 408 to hold word occurrence statistics associated with an information resource that contains one or more occurrences of the words "silicon," and "carbide."

For example, the first two cells 404, 406 of array 400 can be allocated to hold individual word counts of both "silicon" and "carbide." Cell 404 can hold a value representing the number of times the word "silicon" occurs in the information resource. Cell 406 can hold a value representing the number of times the word "carbide" occurs in the information resource. However, it should be understood that each cell can hold values representing different criteria related to the input search phrase, wherein word counts are merely examples.

Cell 408 can be filled with the inverse of the minimum word occurrence distance between the words in the information resource for each combination of words in the search phrase. Finally, it should be understood that the disclosed embodiments are not limited to search phrases of two words, and/or words describing chemical compounds.

Figure 5:
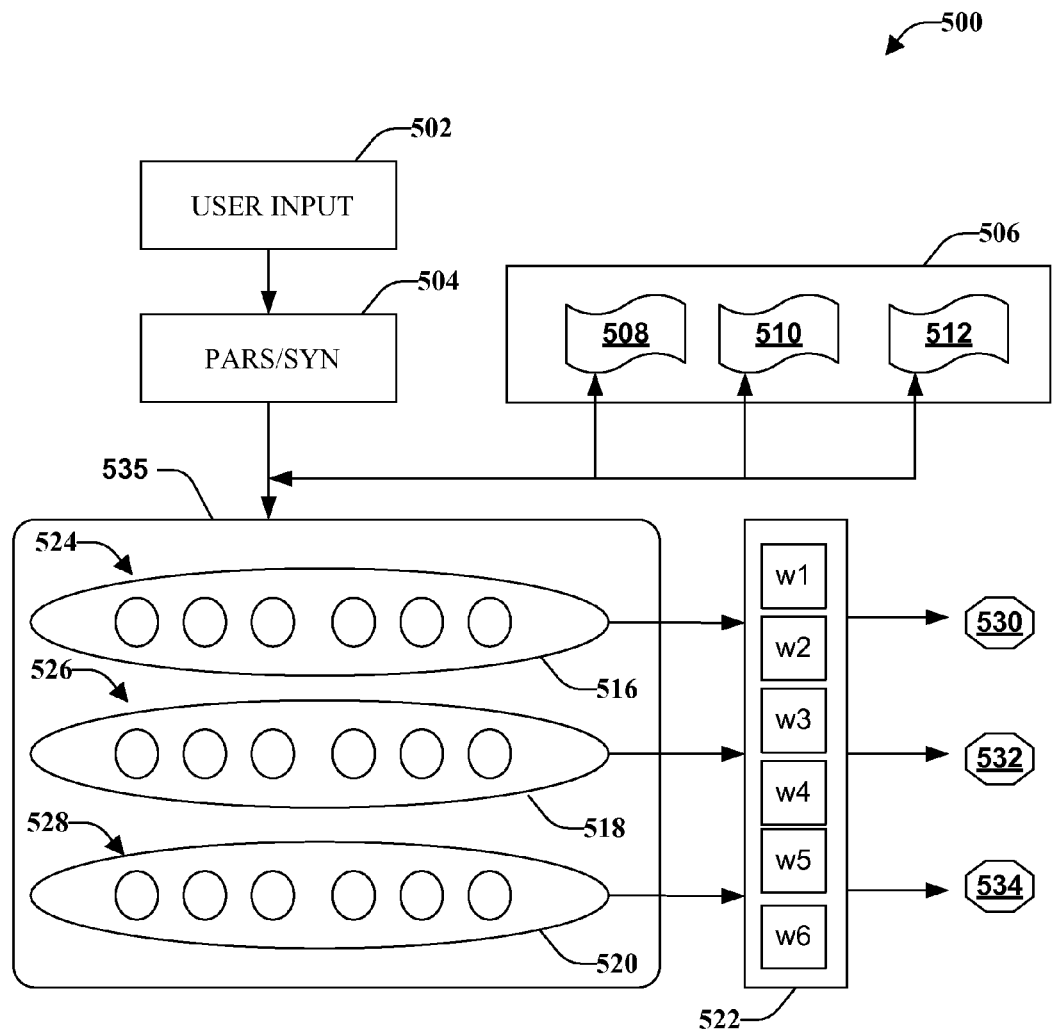
FIG. 5 illustrates a block diagram of an exemplary search system utilizing the disclosed techniques.

FIG. 5 illustrates a block diagram of an exemplary system 500 in utilizing the disclosed techniques. System 500 includes a user input component 502, a parser/synonym generator 504, a document collection component 506, a plurality of documents 508, 510, 512. Also included is a memory 514 with data structures 516, 518, 520, the data structures each have a plurality of memory spaces 524, 526, 528. System 500 further includes a weight data structure 522. A process can be implemented by system 500 that at least produces a plurality of relevancy scores 530, 532, and 534.

System 500 can be configured to accept from or prompt a user to input one or more search queries at the input component 502. Each query can be parsed into the individual words of the query, and one or more synonyms can be identified for each word at the parser/synonym generator 504. System 500 can interface with the document collection 506 that can be, for example, a library system, a database, the Internet, a corporate network, or the like. Documents 508, 510, 512 are examples of documents in the document collection 506 that can be processed by the system 500. However, it is appreciated that disclosed embodiments are not limited to processing three documents per iteration and/or processing three documents total and any number can be processed in accordance with the disclosed embodiments.

System 500 can initialize a data structure 516, 518, 520 in the memory 514 for each document pulled from the document collection 506. Each data structure can be allocated an amount of memory space 524, 526, 528 to hold data. The data can be based on the occurrence of the words and synonyms of the query in the associated document 508, 510, 512. In addition or alternatively, the data can be based in part on a minimum count of information between the words and synonyms for each possible combination of the words. Further, the system 500 can initialize the weight data structure 522, and fill the memory spaces of the weight data structure 522 with weighted values. The weighted values can indicate varying statistical preferences for corresponding data in the memory spaces 524, 526, 528 of the data structures 516, 518, 520. System 500 can execute a mathematical function utilizing the data in the memory spaces 524, 526, 528 of the data structures 516, 518, 520 and the weighted values in the weight data structure 522 in order to produce a relevancy score 530, 532, 534 for each document 508, 510, 512 processed by the system 500. The mathematical function to produce one or more relevancy scores can be based on, for example, the Information Retrieval (IR) formula (e.g. IT*FIT). However, it should be understood that the disclosed embodiments are not limited to this formula as other algorithms, methods, and/or techniques can be utilized.

It is appreciated that system 500 can identify certain sections of the documents 508, 510, 512. For example, system 500 can be configured to recognize titles, author listings, author names, publisher information, abstract sections, bibliographies, citations, and/or numerous paragraphs of each document 508, 510, 512. Thus, the data in the memory spaces 524, 526, 528 of the data structures 516, 518, 520, can be based on occurrences of the words and synonyms of the query in one or more of the aforementioned sections. In one example, system 500 can allow a user to choose one or more document sections on which to base the occurrence data in the memory spaces 524, 526, 528. Additionally, the weighted values of the weight data structure 522 can be configured and updated by the user and/or a system administrator. Such configurations and updates can be performed over an Intranet, from a Personal Digital Assistant or other mobile device, and/or from a web page, for example. Further, system 500 can be configured to understand a variety of languages at substantially the same time and/or alternatively, such as, for example, English, Spanish, Russian, French, etc. It is also noted that the disclosed embodiments are not limited to the number of data structures, memory spaces, weights, relevancy scores, network connections, and/or documents as presented in FIG. 5.

Figure 6:
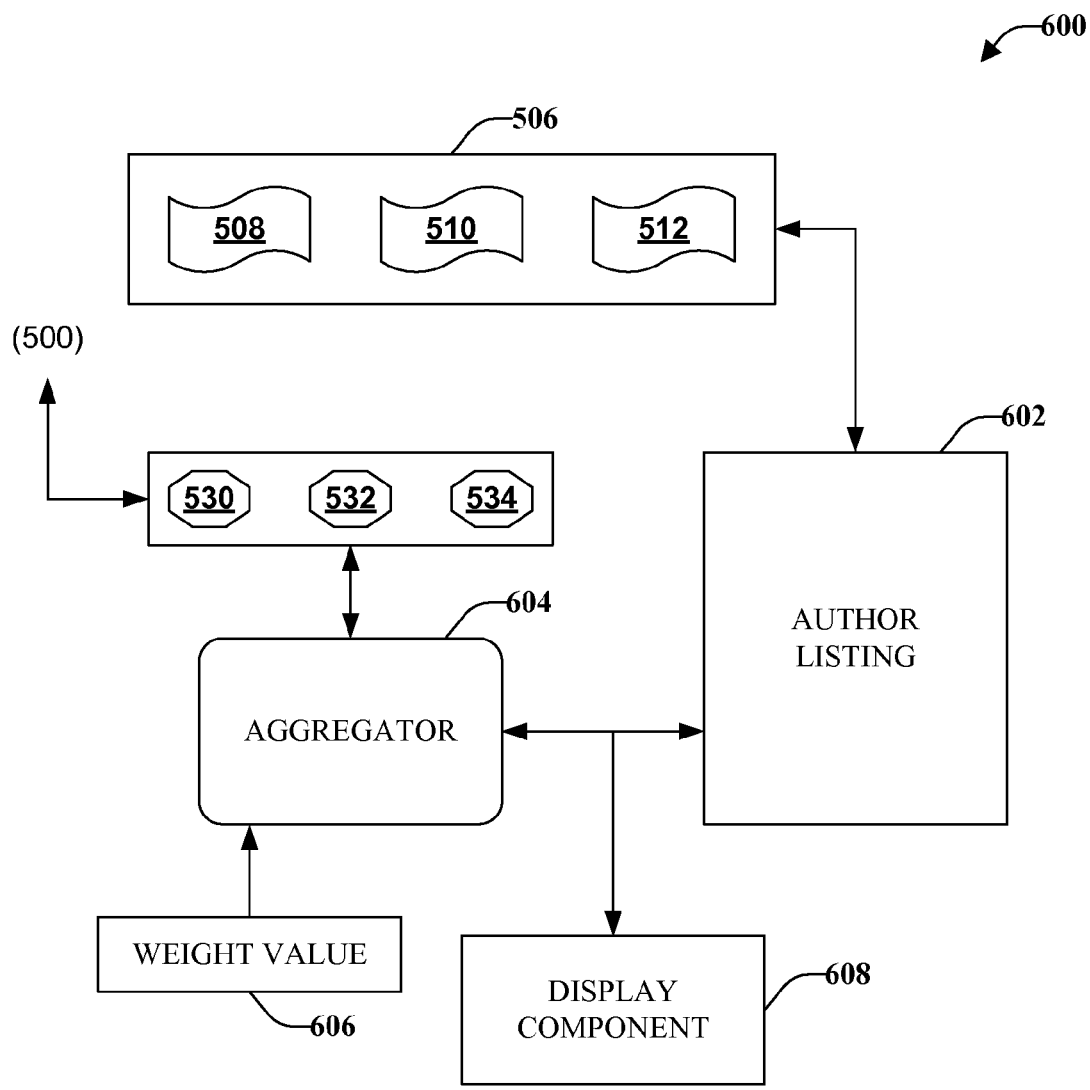
FIG. 6 illustrates a block diagram of an exemplary search system in accordance with the disclosed embodiments.

FIG. 6 is a block diagram of an exemplary system 600 in accordance with one aspect of the disclosed embodiments. System 600 can be coupled to system 500 of FIG. 5 and can access the document collection 506 and the relevancy scores 530, 532, 534. In addition, system 600 can include an author listing 602, an aggregator 604, weight values in memory 606, and a display component 608. The relevancy scores 530, 532, 534 for each document 508, 510, 512 can be utilized by system 600 to calculate a score for each author associated with each document 508, 510, 512. System 600 can utilize the aggregator 604 to calculate an aggregate of the relevancy scores 530, 532, 534 for each author cited in the processed documents 508, 510, 512. The author listing 602 can be a data space that holds the name of each author associated with each document 508, 510, 512.

Values can also be entered into the weight values in memory 606 in order to signify a statistical preference for one or more aspects of the documents 508, 510, 512. For example, the aspects of the documented communications that can be weighted are the date of publication, the venue, the type of documentation, the number of authors, and the like. The system 600 can execute a mathematical function that utilizes the relevancy score aggregate for each author and the weights to arrive at a score for each author. Display component 608 can be configured to display a ranked listing of one or more author scores that can include, for example, presenting the name of each author related to each listed score and a hyperlink to each documented communication associated with each author.

The resulting weighted aggregate author score can be a function related to the publication dates of each document, the prestige of the publisher of each document, and/or the stature of the institution affiliated with each document, for example. It is appreciated that institution scores and/or publisher scores can be generated. It is also noted that weights can be assigned to each author identified in the documents in relation to the user. For example, author scores for authors from the same country as the user and/or within a specified distance from the user can be modified and/or sorted accordingly. Additionally, the disclosed embodiments can provide information as to the authors such as contact information, professional data, and/or URLs associated with the authors and/or associated documents. In yet another example, system 600 can display an author's research profile by subject area based on a query for an individual and/or an institution.

The display component 608 can display the result of the system 600 based on the user's search phrase through a user interface, for example. The user interface can allow the user to choose the format of the result display. For example, the user can choose a tab on the user interface to activate a view of an ordered list of the top scoring authors, and/or a view of an ordered list of the lowest scoring institutions. Additionally, the user can request a view of an ordered list of documents sorted by relevancy to the search phrase, publication date, author, and/or country of publication, for example. Further, it is noted that system 600 can be configured to allow the user to choose one or more result displays before, during, and/or after the system 600 is processing documents and the system 600 allows the user to customize a result display.

Figure 7:
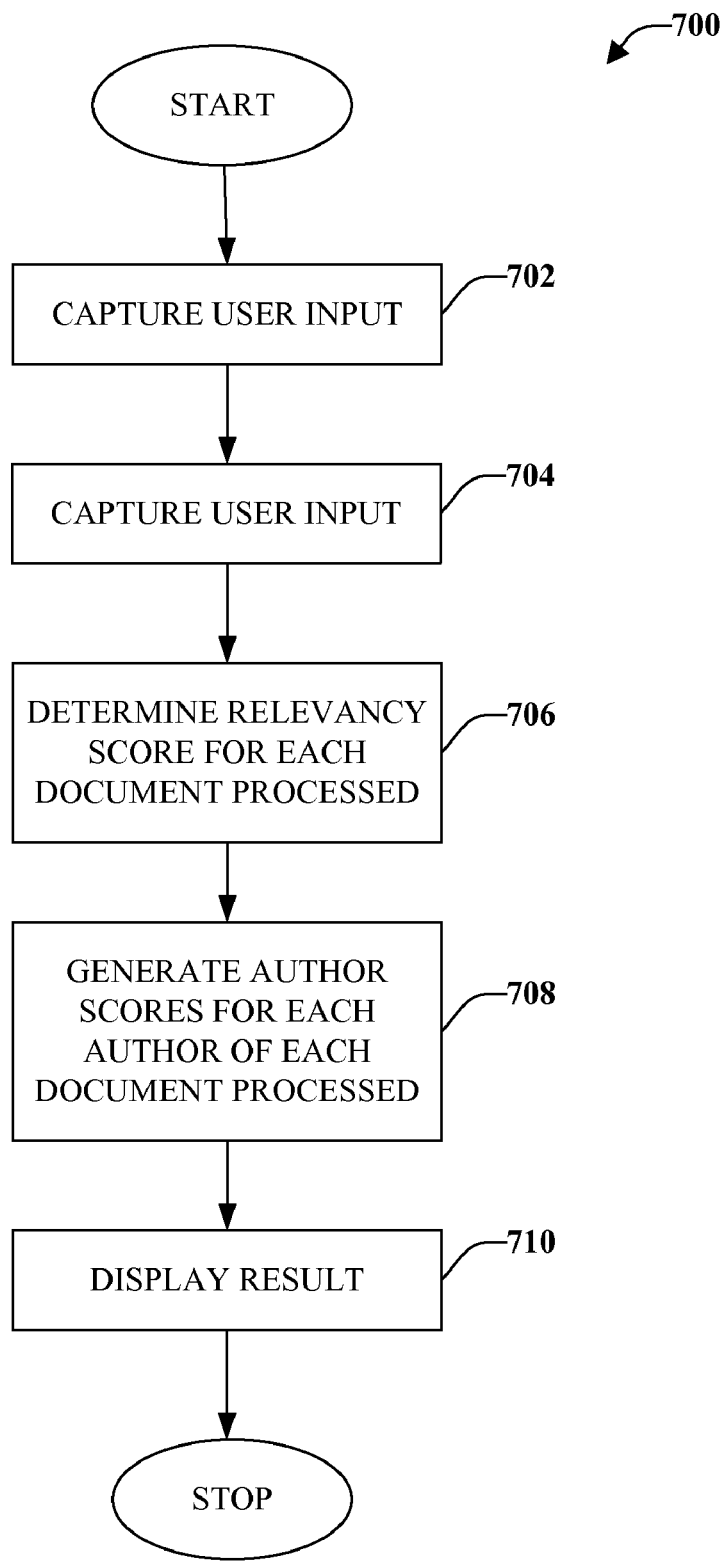
FIG. 7 illustrates a flow diagram of a methodology for an author-centric search.
Figure 8:
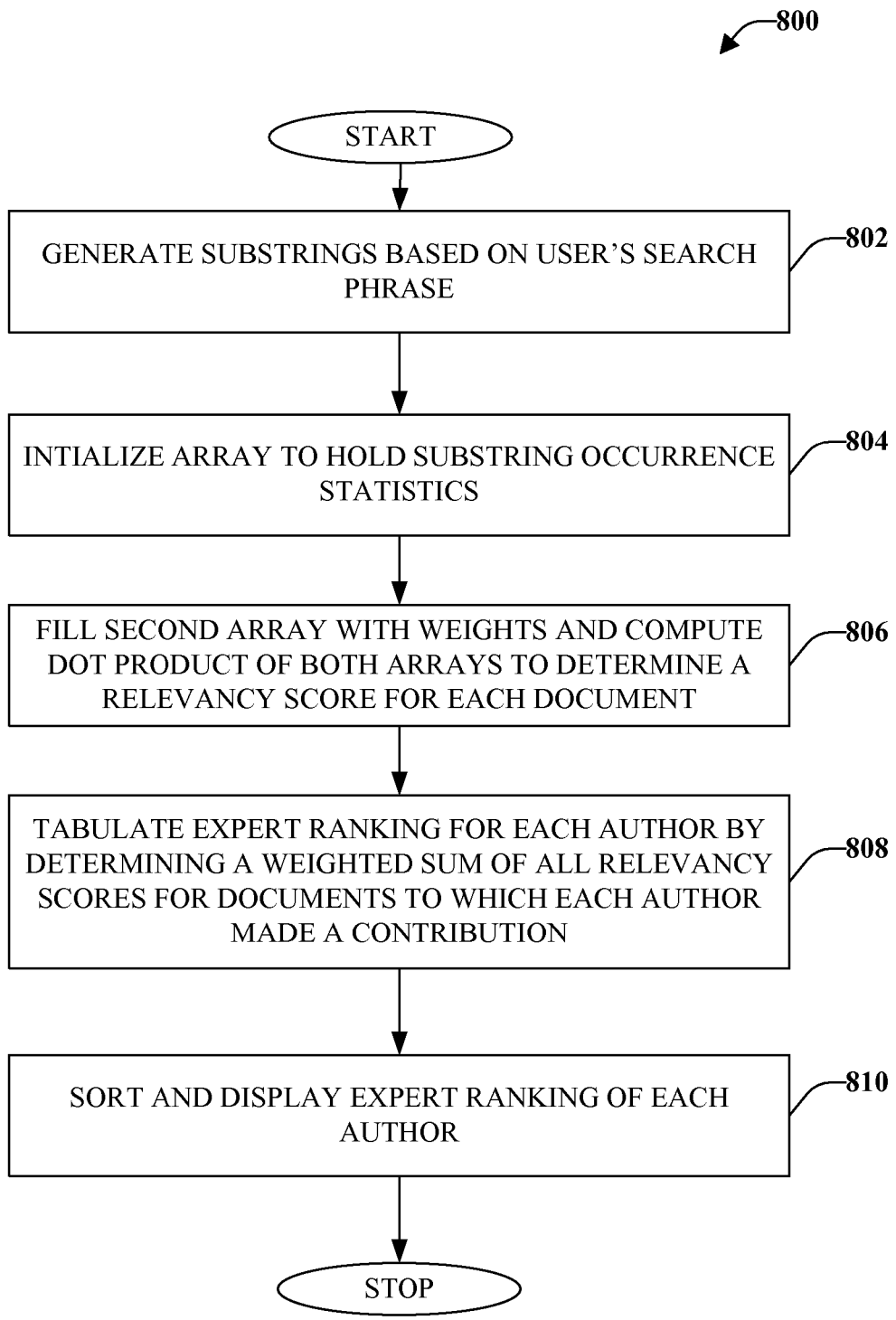
FIG. 8 illustrates a flow diagram of a methodology in accordance with the various embodiments.

In view of the exemplary systems shown and described above, methodologies, which may be implemented in accordance with one or more aspects of the various embodiments, will be better appreciated with reference to the diagram of FIGS. 7-8. While, for purposes of simplicity of explanation, the methodologies are shown and described as a series of blocks, it is to be understood and appreciated that the methodologies are not limited by the order of blocks, as some blocks may, in accordance with these methodologies, occur in different orders and/or concurrently with other blocks from that shown and described herein. It is to be appreciated that the various blocks may be implemented by software, hardware, a combination thereof or any other suitable means (e.g. device, system, process, component) for carrying out the functionality associated with the blocks. It is also to be appreciated that the blocks are merely to illustrate certain aspects presented herein in a simplified form and that these aspects may be illustrated by a lesser and/or greater number of blocks. Moreover, not all illustrated blocks may be required to implement the following methodologies. Those skilled in the art will understand and appreciate that a methodology could alternatively be represented as a series of interrelated states or events, such as in a state diagram.

FIG. 7 illustrates a flow diagram of a methodology 700 for an author-centric search. The method starts, at 702, where a user input is captured. The method 700 can provide a query prompt that allows the user to enter at least one search phrase or search string. At 704, the user's search phrase can be captured and parsed into the individual words that make up the search phrase. Further, additional substrings can be generated based on synonyms of the individual words and/or phrases that relate to the search phrase. It is noted that the user can input multiple related and/or unrelated search phrases to be searched at substantially the same time, randomly, and/or in a sequence specified by the user.

At 706, one or more web-based documents can be processed in order to determine how relevant a web-based document is to the user's one or more search phrases (e.g., keywords). Relevancy can be determined by tracking the occurrences of each substring in the one or more web-based documents. In addition, such tracking can be contextual as to various characteristics of each individual substring occurrence and/or occurrence of multiple substrings. For example, a web-based document can be given a higher determined relevancy for an occurrence of an individual substring in the document's title than another web-based document with the same individual substring occurring in its abstract, or vice versa. Another example of determining the relevancy of a web-based document can involve monitoring the number of words (e.g., word distance) between two search phrase substrings that occur in one web-based document. Accordingly, web-based documents with short word distances can be indicated as having a high relevancy. Such word distance relevancy determinations can be made for each possible combination of search phrase substrings and synonyms.

At 708, the method 700 can utilize the one or more relevancy scores to generate a score for each author associated with the information sources. The score for an author can be a weighted aggregate of the relevancy scores of all information sources of which the author is indicated as a contributor. Several considerations may be included to determine the respective author score. Such considerations include the inference that a large number of relevant documents for an author indicates a higher level of expertise. Time may also be a consideration as newer (e.g., more recent) documents can more accurately reflect the current expertise of an author. An author who has not published in a field for several years is not likely to be a current expert. In addition, an author with a consistent record of publication more likely has greater expertise in the field than an author who only publishes sporadically. The number of authors for a document can be another consideration. IF a publication has multiple authors, each author is most likely responsible for less of the document than if there was only one author. Further considerations the prestige of where the document was found. For example, journals may be more prestigious than conferences and certain publications are more prestigious than others. Further, institutions can be ranked by aggregating the scores of the authors according to their affiliation.

Additionally, at 710, the method 700 can sort and/or display the expert scores of one or more authors according to a format and/or criteria selected by the user. Two or more schemes of providing the information to the user can be utilized. Such schemes include an author-based display and a document-based display. Expert-based display is a style that can be used for expert search. Results can display a score ordered list of the top scoring authors or institution, according to the desired of the user. The user can then view the documents used in determining the score for an author.

Document-based display can be utilized for a standard document search. In a document-based display, the user may not be aware that an author-centric search is being performed. Results can be displayed traditionally, wherein the highest scoring document is displayed first. In databases where all documents have authors, this technique allows for more relevant results to be displayed. Particularly in large databases, many document will receive similar scores in a traditional search. Among these documents, the most relevant are likely to be those authored by the author with the greatest expertise in the desired field.

FIG. 8 illustrates a flow diagram of a methodology 800 in accordance with the various embodiments. At 802, a user input of one or more search phrases is received. As to each search phrase entered, the search phrase can be parsed into substrings. For instance, a search phrase can be parsed into substrings of the individual words and/or groupings of words that make up the original search phrase. Further, the various embodiments can identify synonyms, words, and/or word groupings that are similar to the original search phrase for additional substrings.

At 804, a first array or data structure is initialized for each searched document in order to hold statistics that relate to the occurrence of each substring in the document. The first array can be of length $(n*(n+1))/2$, where n is the number of generated substrings and/or words of the user's search phrase. For instance, an array having a cell length of $(4*5)/2$, or 10, can be initialized for a search phrase containing three words. For each word (e.g., substring), one or more cell or memory space can be filled with the count of word occurrences in the document title and another cell can be filled with the count of word occurrence in the document's abstract. The remaining cells, those cells not allocated for the aforementioned individual word counts, can be filled with a number representing the minimum word distance between search phrase words for each combination of words in the search phrase.

At least one memory space of the first array or data structure can be filled with data that can represent combination data. Such combination data can be based in part on a minimum count of information between words for each possible combination of the one or more words of the search string, for example.

At 806, a second array or data structure is initialized and filled with weights. The weights can be a value that signifies a statistical preference for the data in a memory space of the first data structure. The weights are such that occurrences in the title can be higher than those occurrences in the abstract, occurrences of multiple words can be weighted more highly than occurrences of fewer words, and/or words that occur less often across all documents are weighted more highly than those that occur more often, for example. A dot product of the first array and the second array can be calculated to determine a relevance score for each document.

At 808, an expert ranking or relevancy score can be tabulated for each author based on the relevance score of each document. The expert ranking score for each author can be a weighted sum of all the documents of which they are an author. The weight can be a function of the publication date of each document, for example. In some embodiments, the score can be determined by establishing a communications weight that signifies a statistical preference for one or more aspect of the documents. These aspects can include, but are not limited to, a data of publication, a venue, a type, and a number of authors. In accordance with some embodiments, deriving the score can include executing a mathematical function that utilizes the aggregate for each author and the communication weight.

At 810, the expert ranking scores can be sorted by a specified user criteria and displayed in a user-selected format. The display can be in the form of a ranked listing of one or more author scores. In accordance with some embodiments, the displayed results can present the name of each author related to each listed author score. A hyperlink can be provided for each documented communication associated with each author.

Furthermore, the disclosed embodiments can include an artificial intelligence capability where, for example, prior searches can be stored and updated to provide additional weights and/or data to be utilized during the generation of the one or more expert ranking scores. In accordance with some embodiments, an alert can be provided when a particular author has obtained a past expert ranking score for a former search phrase and that same author registers an expert ranking score for the current user's search phrase. Hence, a user can be provided with additional information regarding the scope of an author's expertise.

Figure 9:
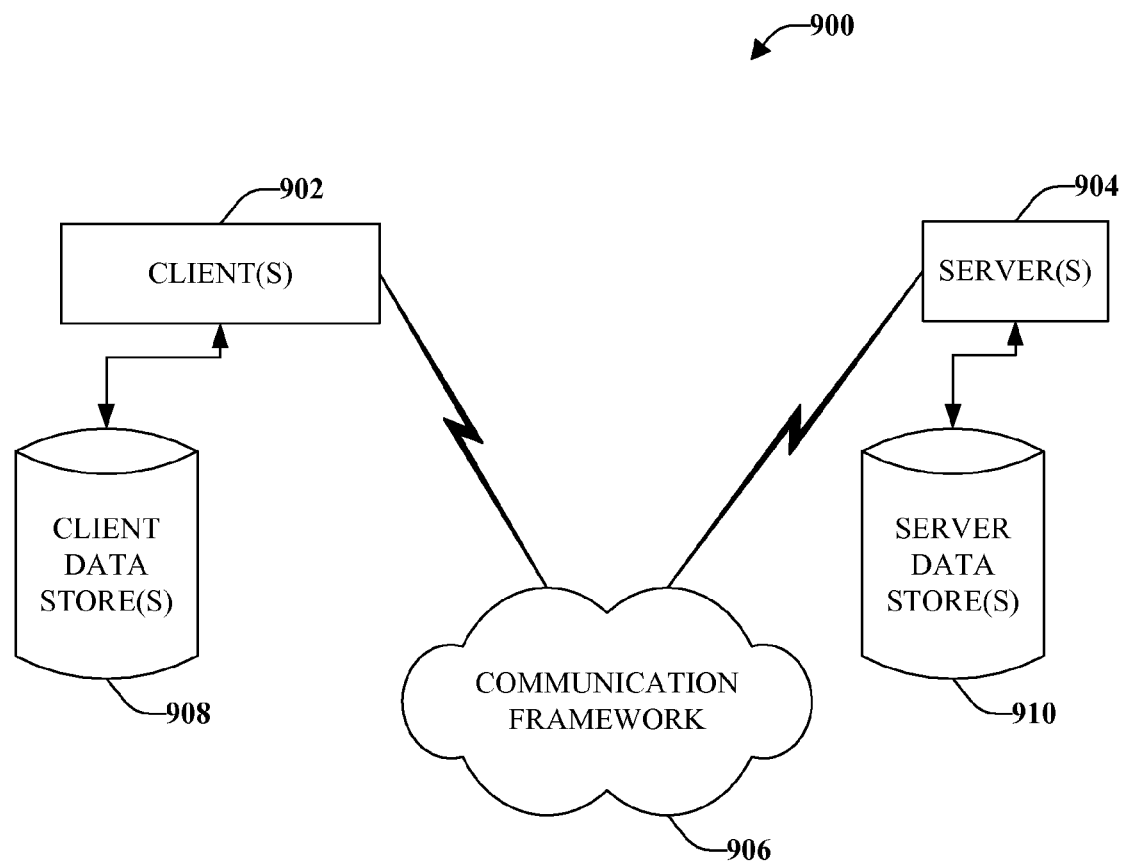
FIG. 9 illustrates a block diagram of a computer operable to execute the disclosed embodiments.
Figure 10:
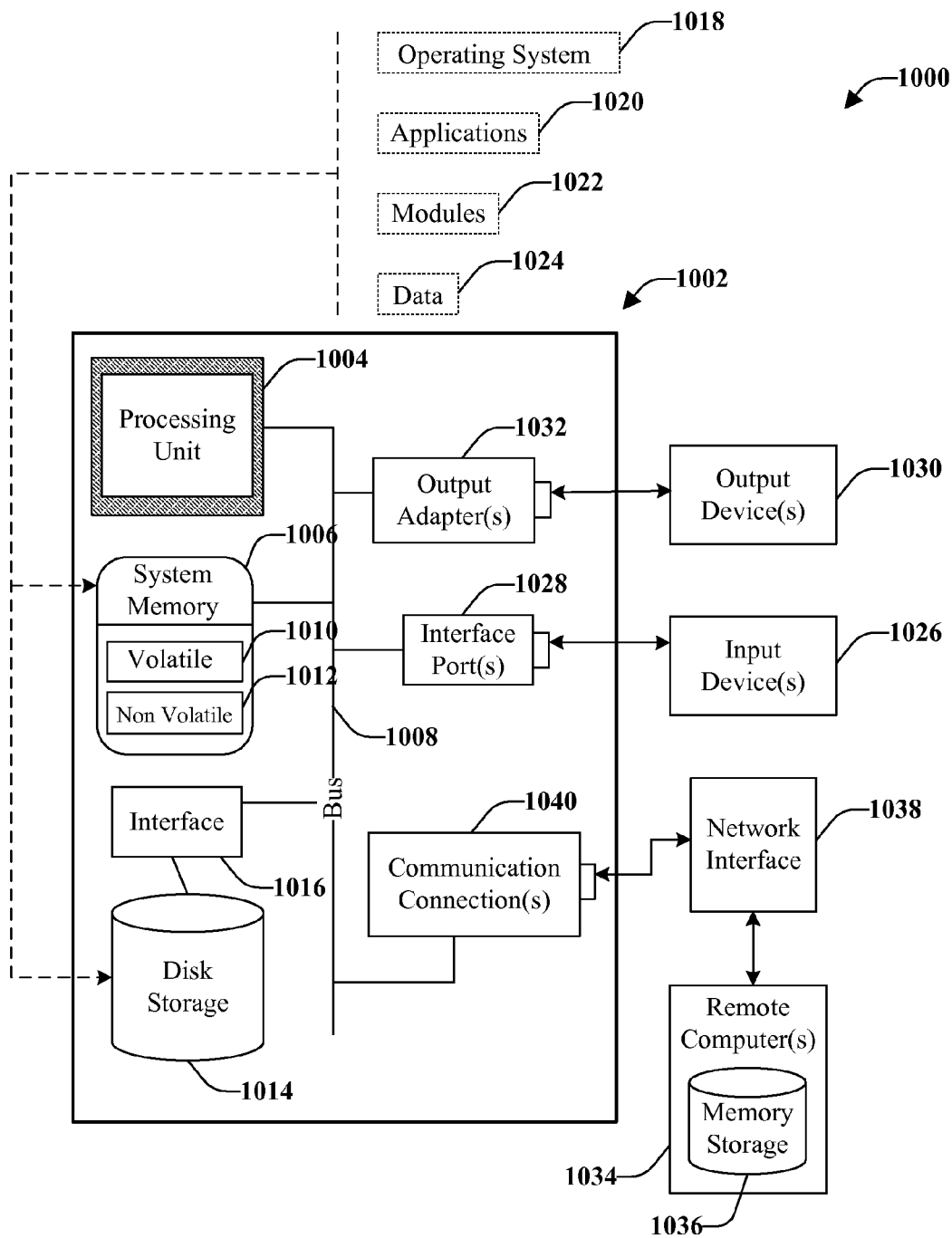
FIG. 10 illustrates a schematic block diagram of an exemplary computing environment operable to execute the disclosed embodiments.

In order to provide additional context for implementing various embodiments, FIGS. 9-10 and the following discussion is intended to provide a brief, general description of a suitable computing environment within which various embodiments may be implemented. While the disclosed embodiments have been described above in the general context of computer-executable instructions of a computer program that runs on a local computer and/or remote computer, those skilled in the art will recognize that the embodiments also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated embodiments may also be practiced in distributed computing environments where certain tasks are performed by remote processing devices that are linked through a communications network. However, some, if not all, embodiments may be practiced on stand-alone computers. In a distributed computing environment, program modules may be located in local and/or remote memory storage devices.

Referring now to FIG. 9, there is illustrated a schematic block diagram of an exemplary computing environment 900 in accordance with the various embodiments. The system 900 includes one or more client(s) 902. The client(s) 902 can be hardware and/or software (e.g., threads, processes, computing devices). The client(s) 902 can house cookie(s) and/or associated contextual information by employing the various embodiments, for example.

The system 900 also includes one or more server(s) 904. The server(s) 904 can also be hardware and/or software (e.g., threads, processes, computing devices). The servers 904 can house threads to perform transformations by employing the various embodiments, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated through a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

With reference to FIG. 10, an exemplary environment 1000 for implementing various aspects of the disclosed embodiments includes a computer 1002. The computer 1002 includes a processing unit 1004, a system memory 1006, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, an 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI) technologies.

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. By way of illustration, and not limitation, non-volatile memory 1012 can include read only memory (ROM), programmable ROM (PROM), electrically programmable ROM (EPROM), electrically erasable ROM (EEPROM), or flash memory. Volatile memory 1010 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1002 also includes removable/non-removable, volatile/non-volatile computer storage media. FIG. 10 illustrates, for example, a disk storage 1014. Disk storage 1014 includes, but is not limited to, devices like a magnetic disk drive, floppy disk drive, tape drive, Jaz drive, Zip drive, LS-100 drive, flash memory card, or memory stick. In addition, disk storage 1014 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used such as interface 1016.

It is to be appreciated that FIG. 10 describes software that acts as an intermediary between users and the basic computer resources described in suitable operating environment 1000. Such software includes an operating system 1018. Operating system 1018, which can be stored on disk storage 1014, acts to control and allocate resources of the computer system 1002. System applications 1020 take advantage of the management of resources by operating system 1018 through program modules 1022 and program data 1024 stored either in system memory 1006 or on disk storage 1014. It is to be appreciated that the one or more embodiments can be implemented with various operating systems or combinations of operating systems.

A user enters commands or information into the computer 1002 through input device(s) 1026. Input devices 1026 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 through interface port(s) 1028. Interface port(s) 1028 include, for example, a serial port, a parallel port, a game port, and a universal serial bus (USB). Output device(s) 1030 use some of the same type of ports as input device(s) 1026. Thus, for example, a USB port may be used to provide input to computer 1002 and to output information from computer 1002 to an output device 1030. Output adapter 1032 is provided to illustrate that there are some output devices 1030 like monitors, speakers, and printers, among other output devices 1030, which require special adapters. The output adapters 1032 include, by way of illustration and not limitation, video and sound cards that provide a means of connection between the output device 1030 and the system bus 1008. It should be noted that other devices and/or systems of devices provide both input and output capabilities such as remote computer(s) 1034.

Computer 1002 can operate in a networked environment using logical connections to one or more remote computers, such as remote computer(s) 1034. The remote computer(s) 1034 can be a personal computer, a server, a router, a network PC, a workstation, a microprocessor based appliance, a peer device or other common network node and the like, and typically includes many or all of the elements described relative to computer 1002. For purposes of brevity, only a memory storage device 1036 is illustrated with remote computer(s) 1034. Remote computer(s) 1034 is logically connected to computer 1002 through a network interface 1038 and then physically connected through communication connection 1040. Network interface 1038 encompasses communication networks such as local-area networks (LAN) and wide-area networks (WAN). LAN technologies include Fiber Distributed Data Interface (FDDI), Copper Distributed Data Interface (CDDI), and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1040 refers to the hardware/software employed to connect the network interface 1038 to the bus 1008. While communication connection 1040 is shown for illustrative clarity inside computer 1002, it can also be external to computer 1002. The hardware/software necessary for connection to the network interface 1038 includes, for exemplary purposes only, internal and external technologies such as, modems including regular telephone grade modems, cable modems and DSL modems, ISDN adapters, and Ethernet cards.

What has been described above includes examples of various embodiments. It is, of course, not possible to describe every conceivable combination of components or methodologies for purposes of describing the various embodiments, but one of ordinary skill in the art may recognize that many further combinations and permutations of the embodiments are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary embodiments. In this regard, it will also be recognized that the embodiments includes a system as well as a computer-readable medium having computer-executable instructions for performing the acts and/or events of the various methods of one or more embodiments.

In addition, while a particular feature of an embodiment may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented method for an author-centric search, comprising:
    initializing a first data structure and a second data structure for each of a plurality of documented communications wherein each of the plurality of documented communications has at least one author to which the respective documented communication is attributed;
    utilizing the first data structure and the second data structure to compute a relevancy score for each of the plurality of documented communications;
    determining a score for an author of at least one of the plurality of documented communications based in part on the relevancy score for each of the plurality of documented communications authored by the author;
    prompting a user to enter a search string;
    parsing the search string into one or more words;
    populating at least one memory space of the first data structure for each documented communication with data based on the occurrence of the one or more words in the documented communication;
    populating at least one memory space of the second data structure for each documented communication with a weighted value for an author of a given documented communication that signifies a statistical preference for the data in the corresponding memory space of the first data structure;
    executing a mathematical function based on an aggregate of the data and the weighted value of the first and second data structures for each documented communication in order to compute the relevancy score for the documented communication; and
    displaying search results based at least in part upon a ranked listing of one or more author scores, wherein the weighted value for the author comprises a predefined value utilized to create the statistical preference for data in the corresponding memory space of the first data structure, the weighted value for the author being determined based on at least two of: a time of publication for the documented communication, a number of documented communications having the author, a prestige of the documented communication, and a number of authors for the documented communication.

2. The method of claim 1, the data further comprising combination data, the combination data based in part on a minimum count of information between words for each possible combination of the one or more words of the search string.

3. The method of claim 1, determining the score comprises calculating an aggregate of relevancy scores for each of the plurality of documented communications associated with the author.

4. The method of claim 1, determining the score further comprises establishing a communications weight to signify a statistical preference for one or more aspects of the plurality of documented communications.

5. The method of claim 4, the one or more aspects of the plurality of documented communications comprise at least one of a date of publication, a venue, a type, and a number of authors.

6. The method of claim 1, determining the score further comprises executing a mathematical function that utilizes the aggregate for each author and the communications weight to arrive at the score.

7. The method of claim 1, the displaying further comprising presenting the name of each author related to each listed author score and a hyperlink to each documented communication associated with the each author.

8. A system for an author-centric search, the system including a processor and memory, the system comprising:
    means for initializing a first data structure and a second data structure for each of a plurality of documented communications wherein each of the plurality documented communications has at least one author to which the respective documented communication is attributed;
    means for utilizing the first data structure and the second data structure to compute a relevancy score for each of the plurality of documented communications;
    means for determining a score for each author of at least one of the plurality of documented communications based in part on the relevancy score for each of the plurality of documented communications authored by each respective author;
    means for prompting a user to enter a search string;
    means for parsing the search string into one or more words;
    means for filling at least one memory space of the first data structure for each documented communication with data based on the occurrence of the one or more words in the documented communication;
    means for filling at least one memory space of the second data structure for each documented communication with a weighted value for an author of a given documented communication that signifies a statistical preference for the data in the corresponding memory space of the first data structure; and
    means for executing a mathematical function based on an aggregate of the data and the weighted value of the first and second data structures for each documented communication in order to compute the relevancy score for the documented communication; and
    means for displaying search results based at least in part upon a ranked listing of the score determined for each of the authors, wherein the weighted value for an author comprises a predefined value utilized to create the statistical preference for data in the corresponding memory space of the first data structure, the weighted value for the author being determined based on at least two of: a time of publication for the documented communication, a number of documented communications having the given author, a prestige of the documented communications, and a number of authors for the documented communication.

9. The system of claim 8, wherein the search result display component displays the search results as an ordered list of authors ranked based on the author score generated for each of the authors.

10. The system of claim 8, wherein the expert weight value and the relevancy score are independent values.

11. The system of claim 8, wherein author score further comprises a weighted sum of the relevancy scores for each of the documented communications to which the author contributed.

12. The system of claim 8, wherein the means for displaying further displays the name of at least one author of a given documented communication.

13. The system of claim 8, wherein the means for displaying further displays:
   a ordered list of a plurality of individuals that are ranked according to an author score generated for each of the plurality of individuals; and
   an ordered list of a plurality of institutions that are ranked according to an author score generated each of the plurality of institutions.

14. The method of claim 1, wherein the one or more authors scores comprises a plurality of author scores each associated with a different author, the displaying further comprising presenting an ordered list of the different authors ranked by the associated author score.

15. The system of claim 8, wherein the means for displaying further comprising means for presenting an ordered list of the each of the authors ranked by the score associated with each of the authors.

* * * * *